(12) United States Patent
Harika

(10) Patent No.: US 8,521,592 B2
(45) Date of Patent: Aug. 27, 2013

(54) SYSTEM AND METHOD FOR ADVERTISING ON THE INTERNET

(76) Inventor: Elias Youssef Harika, Jounieh (LB)

( * ) Notice: Subject to any disclaimer, the term of this patent is extended or adjusted under 35 U.S.C. 154(b) by 130 days.

(21) Appl. No.: 13/118,434

(22) Filed: May 29, 2011

(65) Prior Publication Data

US 2011/0231259 A1     Sep. 22, 2011

Related U.S. Application Data

(60) Provisional application No. 61/454,640, filed on Mar. 21, 2011.

(51) Int. Cl.
*G06Q 30/00* (2012.01)

(52) U.S. Cl.
USPC .............. 705/14.55; 705/14.56; 705/14.69; 705/14.73

(58) Field of Classification Search
CPC ....................................................... G06F 30/00
USPC ................ 705/14.55–14.56, 14.69, 14.73
See application file for complete search history.

(56) References Cited

U.S. PATENT DOCUMENTS

| 6,269,361 B1 * | 7/2001 | Davis et al. ............................ 1/1 |
| 2008/0133647 A1 * | 6/2008 | Hamzeh ........................ 709/202 |
| 2008/0228572 A1 | 9/2008 | Teterin |
| 2008/0287150 A1 * | 11/2008 | Jiang et al. .................... 455/466 |
| 2009/0192928 A1 * | 7/2009 | Abifaker .......................... 705/35 |
| 2010/0274651 A1 | 10/2010 | Huddleston |

FOREIGN PATENT DOCUMENTS

| WO | W003015430 A1 | 2/2003 |
| WO | W02007086051 A2 | 8/2007 |
| WO | W02008130565 A1 | 10/2008 |

* cited by examiner

*Primary Examiner* — Raquel Alvarez
(74) *Attorney, Agent, or Firm* — Steven N Fox, Esq.

(57) ABSTRACT

A web site for advertising on the internet. The web site comprises a web based server in communication with the internet. The web-site further comprises an advertiser module adapted to receive a DISPLAY AD and a MESSAGE AD. The advertiser module further comprises a message module having code configured to serve an advertiser host web page to an internet surfer upon activation of the DISPLAY AD by the surfer. The advertiser host page comprises a message box having first and second a message fields and a cell phone number field. The first and second message fields are adapted to receive either a SMS message or a MMS entered by the surfer, respectively. The message module further comprises code adapted to send the SMS or MMS message and the MESSAGE AD.

9 Claims, 16 Drawing Sheets

SYSTEM AND METHOD FOR ADVERTISING ON THE INTERNET

CROSS-REFERENCE TO RELATED APPLICATIONS

This application claims priority to U.S. Provisional Application Ser. No. 61/454,640 filed on Mar. 21, 2011, which is hereby incorporated in its entirety into this specification.

BACKGROUND OF THE INVENTION

Pay-per-click (PPC) advertising is the most common form of direct advertising on the internet. FIG. 1 illustrates a web search page 100 of a conventional search engine such as Google®, Yahoo® or Bing® where an internet surfer (not shown) can surf or search the internet by first entering target key words in a keyword box 112 and then conducting the search by clicking search link 114 resulting in a search result list 116. To the right of the search result list 116 is a plurality of conventional PPC Ads 102, 104, 106, 108 and 110. An internet surfer who clicks, for example, PPC Ad 102 is directed to a web-site located at the address of www.x1.com. The advertiser is charged a fee each time its PPC Ad is clicked by an internet surfer. The fee depends upon many factors, including how many advertisers want the same keyword and the location of the PPC Ad on web search page. Publishers of web-sites having high traffic also benefit from PPC advertising by allowing PPC Ads to be displayed on their web pages. A publisher web-site may be defined as any web-site or network of web-sites published on the internet by a person or company that has regularly updated content and a high degree of traffic. Each time the PPC Ad is clicked by an internet surfer, the publisher is paid a percentage of the fee charged to the advertiser. Every day, internet surfers click many advertisements as they surf the internet which costs advertisers sponsoring PPC Ads a significant amount of money. Often, the amount of traffic generated does not result in enough sales to cover the costs of advertising. In such cases, the advertiser is left without a cost effective way to advertise on the internet.

SUMMARY OF THE INVENTION

One object of the present invention is to provide a cost effective way for on-line businesses to advertise on the internet.

Another object of the present invention is provide an on-line advertising system that increases the likelihood that an advertisement is viewed by a recipient who is highly interested in the advertisement resulting in more conversions or sales per lead.

The present invention is directed to a system or web site for advertising on the internet. The web site comprises a web based server in communication with the internet. The web-site further comprises an advertiser module stored on the server to receive an advertising campaign entered by an advertiser. The advertising module comprises a Display Ad generator module having a set of code configured so the advertiser can create and store a DISPLAY AD in the data base. The advertising module further comprises a Message Ad generator module having a set of code configured so the advertiser can create and store a MESSAGE AD in the data base. The advertiser module further comprises a location module having a set of code configured so the advertiser can select a publisher's website to place the DISPLAY AD. The advertiser module further comprises an activation module having a set of code adapted to allow the advertiser to start and stop the advertising campaign. The advertiser module further comprises a message module having a first set of code configured to serve an advertiser host web page to the internet surfer upon activation of the DISPLAY AD by the internet surfer. The advertiser host page comprises a first portion having a message box and a second portion displaying the web page of the advertiser corresponding to the URL address entered by the advertiser. The message box comprises first and second message fields and a cell phone number field. The first and second message fields are adapted to receive a SMS message or a MMS entered by the internet surfer, respectively. The cell phone number field is adapted to receive a cell phone number entered by the internet surfer corresponding to the communication device of the recipient. The message module comprises a second set of code adapted to pre-populate the message field with the MESSAGE AD created by the advertiser. The message module further comprises a third set of code adapted to send or transmit the SMS or MMS message and the MESSAGE AD to the communication carrier for transmission to the communication device of the recipient. The advertiser module further comprises a billing module having a first set of code adapted to charge the advertiser a fee when the SMS or MMS message and MESSAGE AD is sent to the communication carrier.

BRIEF DESCRIPTION OF THE DRAWINGS

The following description of the invention will be more fully understood with reference to the accompanying drawings in which.

DESCRIPTION OF THE INVENTION

Figure 1:
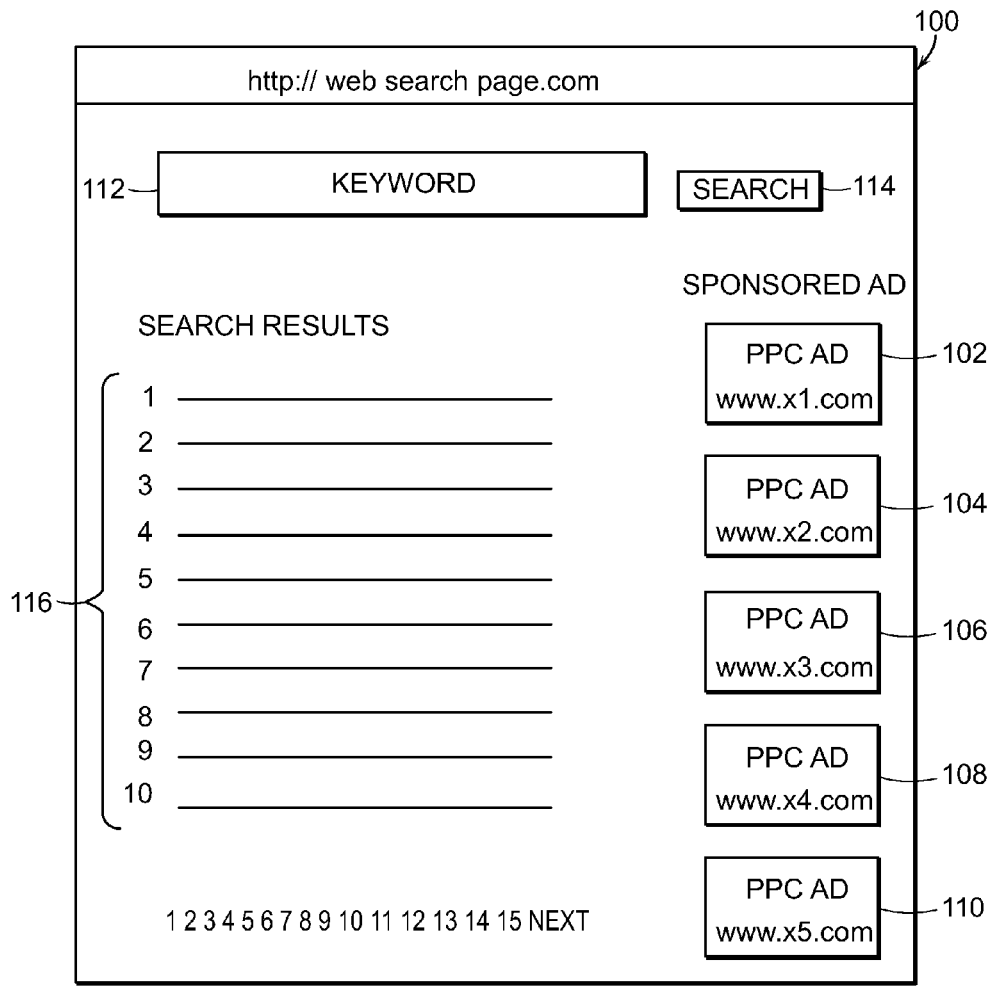
FIG. 1 illustrates a conventional search engine web page having a plurality of PPC Ads positioned to the right of a search result list.
Figure 2:
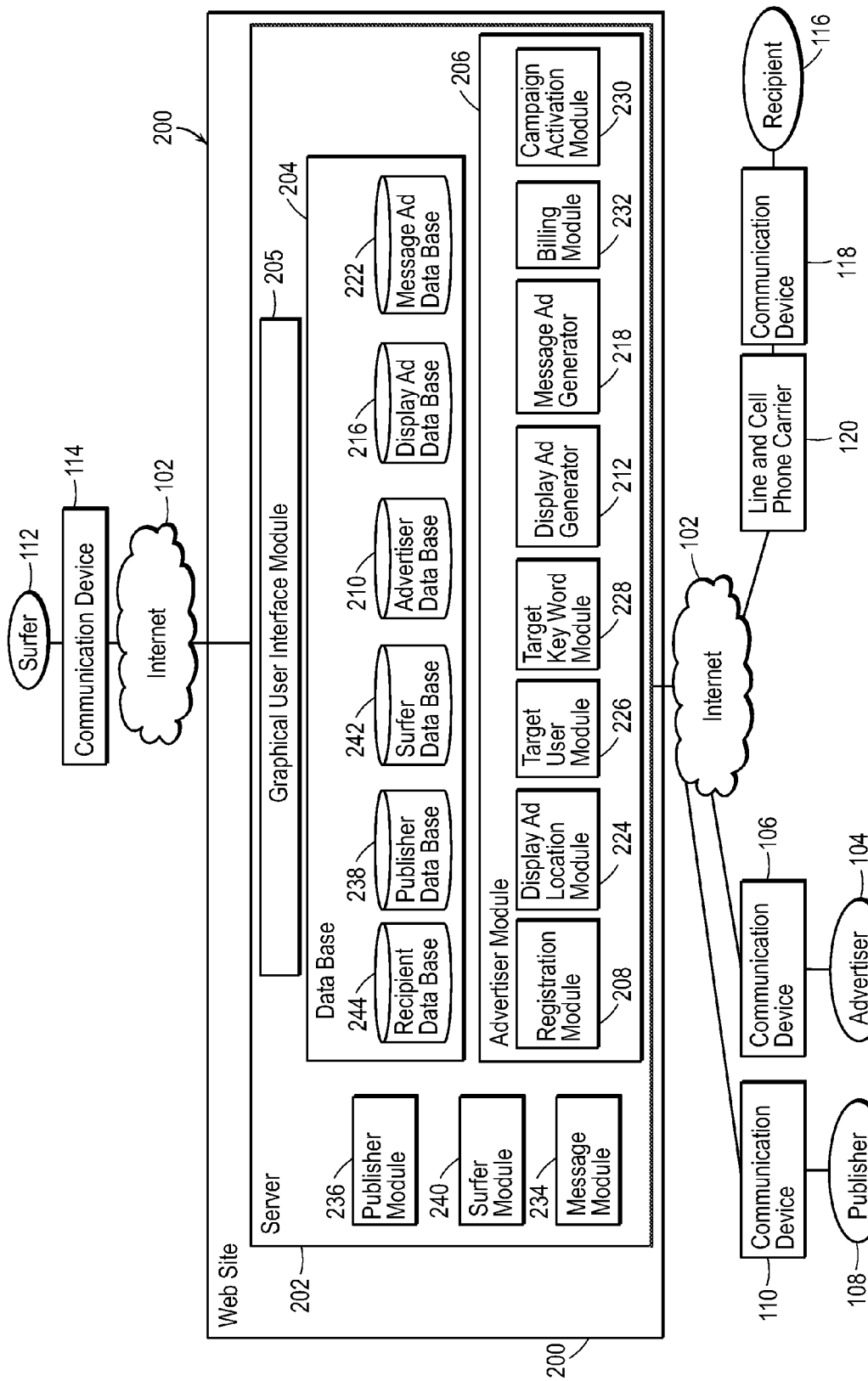
FIG. 2 is a high level block diagram of a system according to the present invention.

Referring to FIG. 2, a web site 200 according to a first embodiment of the present invention is shown in communication with an internet and/or world wide web 102. In one embodiment, web-site 200 comprises a web based server 202 in communication with internet 102. Web based server 202 comprises a data base 204 generally adapted to store information entered by an advertiser 104 having a communication device 106, a publisher 108 having a communication device 110, and an internet surfer 112 having a communication device 114. Web-site 200 further comprises a graphical user interface (GUI) 205 stored on web based server 202 to allow communication with a web browser (not shown) of communication devices 106, 110, and 114 used by advertiser 104, publisher 108, and internet surfer 112, respectively. Web based server 202 may be any type of conventional web based server such as the POWERSERVE DUO T2000 web based server available from PSSC Labs, 20432 North Sea Circle Lake Forest, Calif. 92630, www.pssclabs.com. Communication devices 106, 110 and 114 may be any type of hard wired and/or wireless communication device such as a desk top computer and/or a portable hand held communication such as an iPhone® by Apple® having a browser and access to the internet that allows communication with GUI 205.

Figure 3:
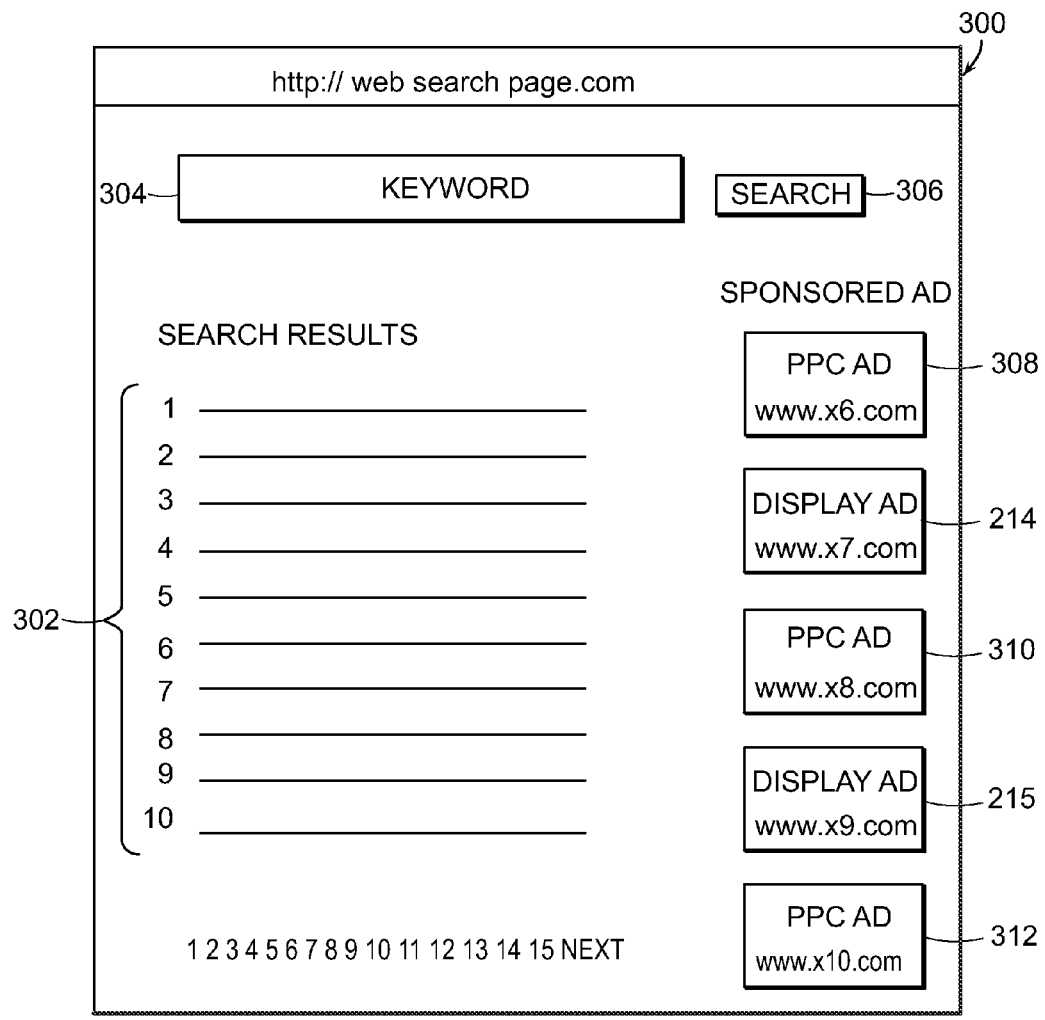
FIG. 3 is a search engine web page showing a DISPLAY AD according to the present invention to the right of a conventional search result list.
Figure 4:
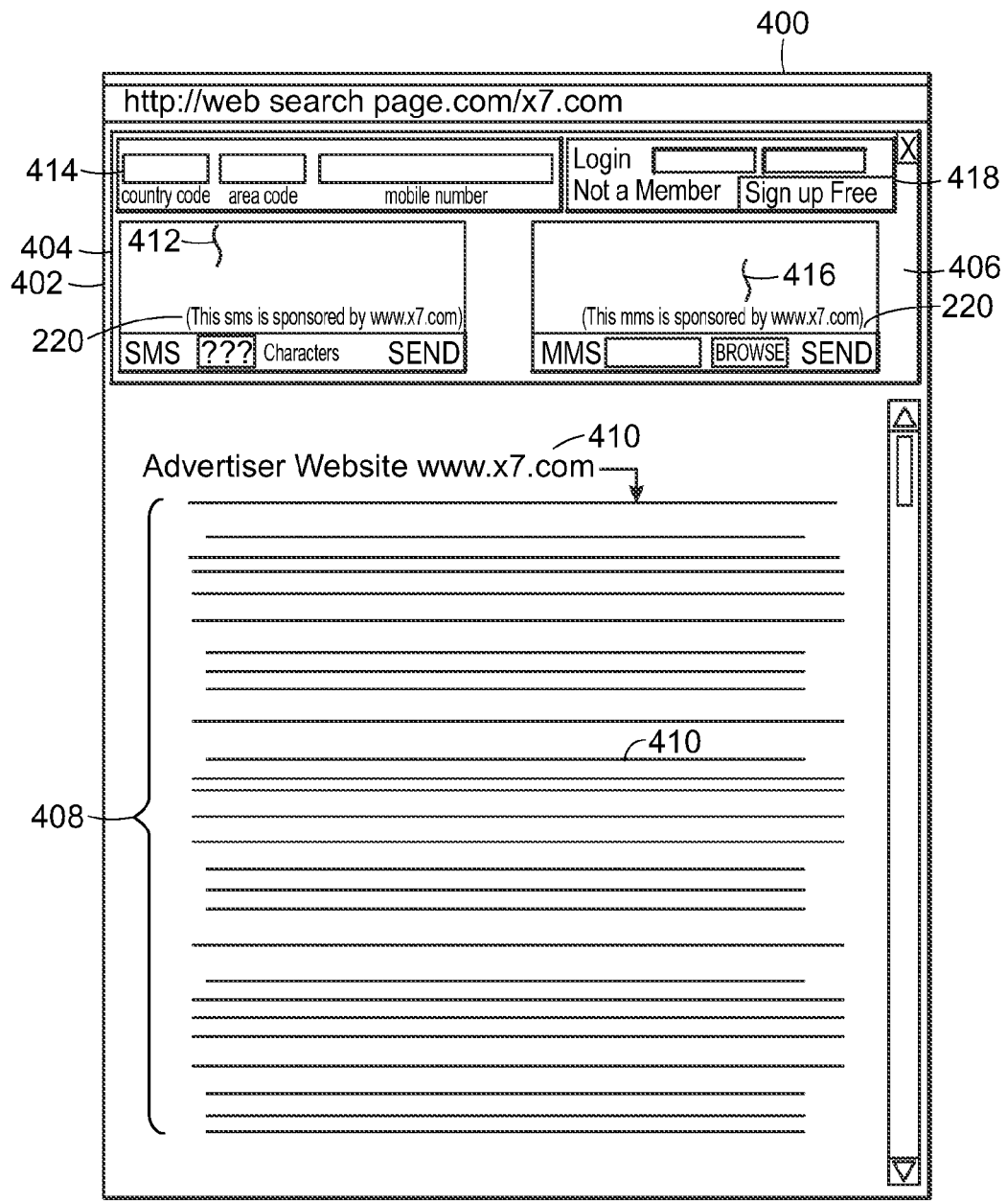
FIG. 4 is an advertiser host web page according to the present invention having a first portion showing a message box and second portion showing the web page of the advertiser.

With reference to FIGS. 2-4, web-site 200 further comprises an advertiser module 206 stored on server 202 adapted to receive and operate an advertising campaign (to be described) entered by advertiser 104 using communication device 106. Advertiser module 206 comprises a registration module 208 having a first set of code configured to receive an URL address for a web page of advertiser 104 and to store the URL address in an advertiser data base 210 of data base 204. Advertising module 206 further comprises a Display Ad generator module 212 having a first set of code configured so advertiser 104 can create and store DISPLAY AD 214 and DISPLAY AD 215 in a Display Ad data base 216 of data base 204. Advertising module 206 further comprises a Message Ad generator module 218 having a first set of code configured so advertiser 104 can create and store a MESSAGE AD 220 (FIG. 4—to be described) in a Message Ad data base 222 of data base 204. Advertiser module 206 further comprises a Display Ad location module 224 having a first set of code configured so advertiser 104 can select one of the publisher's web-sites or networks (URL address) on internet 102 to place DISPLAY AD 214 and DISPLAY AD 215.

FIG. 3 illustrates a conventional search engine search result web page 300 having DISPLAY ADS 214 and 215 placed to the right of a conventional search result list 302 generated by internet surfer 112 by entering key words (not shown) in a key word box 304 and hitting or activating a search link 306. Conventional PPC Ads 308, 310, and 312 may also appear along with DISPLAY ADS 214 and 215. As will be described more fully herein, DISPLAY ADS 214 and 215 may be created as part of several advertising campaigns by the same or different advertiser.

Referring back to FIG. 2, Advertiser module 206 further comprises a target user module 226 having a first set of code configured to allow advertiser 104 to select the demographics of internet surfer 112 that advertiser 104 wants to view DISPLAY AD 214. Advertiser module 206 further comprises a target key word module 228 having a first set of code configured to allow advertiser 104 to select one or more keywords. Advertiser module 206 further comprises an activation module 230 having a first set of code adapted to allow advertiser 104 to start and stop the advertising campaign. Advertiser module 206 further comprises a billing module 232 having a first set of code adapted to charge advertiser 104 a fee when a SMS message 502 (FIG. 5—to be described) and MESSAGE AD 220 (FIG. 5—to be described) are sent by surfer 112 to a communication carrier 120 for transmission to a communication device 118 of a recipient 116. In the embodiment shown, communication device 118 is a cell phone or any hand held portable communication device having wireless telephone capability or VOIP capability. Billing module 232 comprises a second set of code adapted to charge advertiser 104 a fee when SMS message 502 (FIG. 5—to be described) and MESSAGE AD 220 (FIG. 5—to be described) are sent to communication carrier 120.

With reference to FIGS. 2 and 4, web based server 202 further comprises a message module 234 having a first set of code configured to serve an advertiser host web page 400 (FIG. 4) to internet surfer 112 upon activation of DISPLAY AD 214 by internet surfer 112. Advertiser host web page 400 comprises a first portion 402 displaying first and second message boxes 404 and 406. Advertiser host web page 400 comprises a second portion 408 displaying a web page 410 of advertiser 104 corresponding to the URL address entered by advertiser 104 which in the drawing is shown as www.x7.com. First message box 404 is a well known SMS message box comprising a message field 412 and a cell phone number field 414. Second message box 406 is a well known MMS message box comprising a message field 416 and cell phone number field 414. Advertiser host web page 400 further comprises a login box 418 adapted to receive registration and/or log-in information (not shown) from internet surfer 112 using communication device 114.

Figure 5:
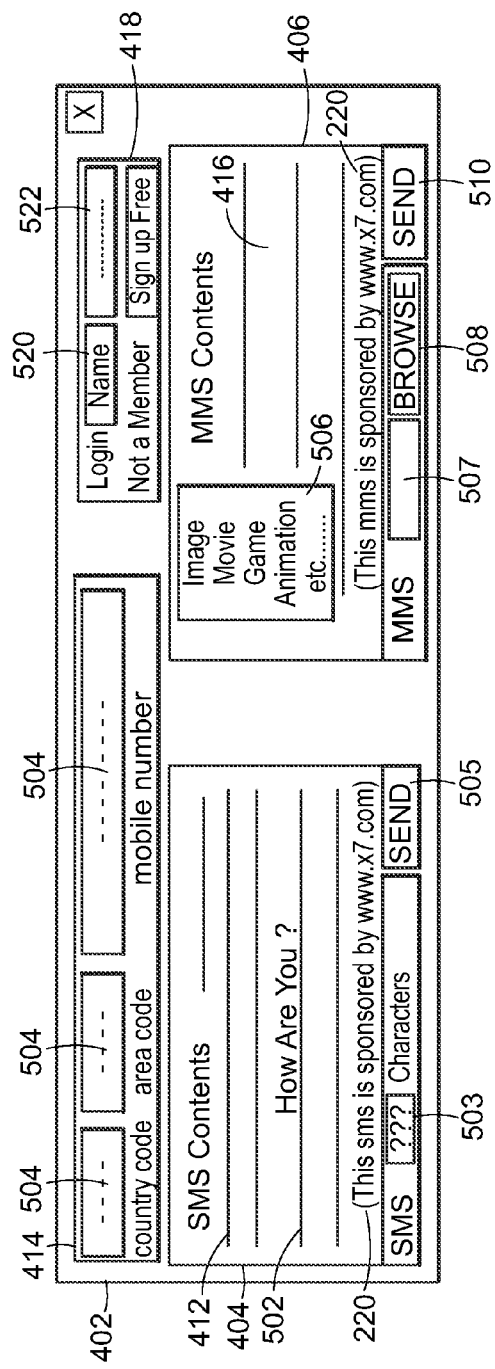
FIG. 5 shows a message box of the advertiser host web page after log-on by an internet surfer.

Referring to FIG. 5, after internet surfer 112 successfully enters a user name 520 and a password 522 into login box 418, message field 412 of first message box 404 is adapted to receive a message 502 entered by internet surfer 112 via entry box 503. Cell phone number field 414 of first message box 404 is adapted to receive a cell phone number 504 entered by internet surfer 112 corresponding to a communication device 118 of a recipient 116. First box 406 further comprises a SEND link operable by surfer 112 to send SMS message 502 and MESSAGE AD 200 to communication carrier 120 corresponding to the cell phone number entered by surfer 112. Message field 416 of second message box 406 is adapted to receive a message 506 entered by internet surfer 112 via a file look-up box 507 and a BROWSE button 508. Cell phone number field 414 of second message box 406 is adapted to receive a cell phone number 504 entered by internet surfer 112 corresponding to communication device 118 of recipient 116. First and second message boxes 404 and 406 may be any type of message service technology currently and/or futurely developed. Message module 234 further comprises a second set of code adapted to pre-populate message field 412 of first message box 404 and message field 416 of second message box 406 with MESSAGE AD 220 created by advertiser 104. Message module 230 further comprises a third set of code adapted (to be described) to send or transmit message 502 or 506 along with MESSAGE AD 220 to communication carrier 120 for sending to communication device 118 of recipient 116. Message module 230 further comprises a fourth set of code (to be described) adapted to store the cell phone number of corresponding to communication device 118 of recipient 116 in a recipient data base 244 of data base 204.

With continued reference to FIG. 2, server 202 further comprises a publisher module 236 having a first set of code (to be described) adapted to serve a publisher web page (not shown) to publisher 108. Publisher module 236 comprises a second set of code (to be described) configured to receive registration and/or log-in information (not shown) from publisher 108 and to store the registration and/or log-in information in a publisher data base 238 of data base 204. Publisher module 236 comprises a third set of code configured to generate a display code (not shown) for publisher 108 so that DISPLAY AD 214 created by advertiser 104 (or DISPLAY AD 215 created by the same or different advertiser) can be placed or displayed on publisher's web page 300 (FIG. 3).

With reference to FIG. 2, Server 202 further comprises an internet surfer module 240 having a first set of code adapted to adapted to serve an internet surfer web page (not shown) to surfer 112. Internet surfer module 240 comprises a second set of code configured to receive registration and/or log-in information (not shown) from surfer 112 and to store the registration and/or log-in information in an internet surfer data base 242 of data base 204.

Figure 6:
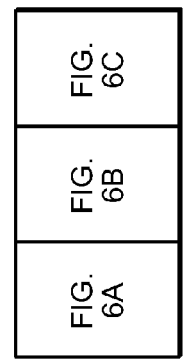
FIG. 6 is a high level flow chart showing the operation of the advertiser module according to the present invention.
Figure 6A:
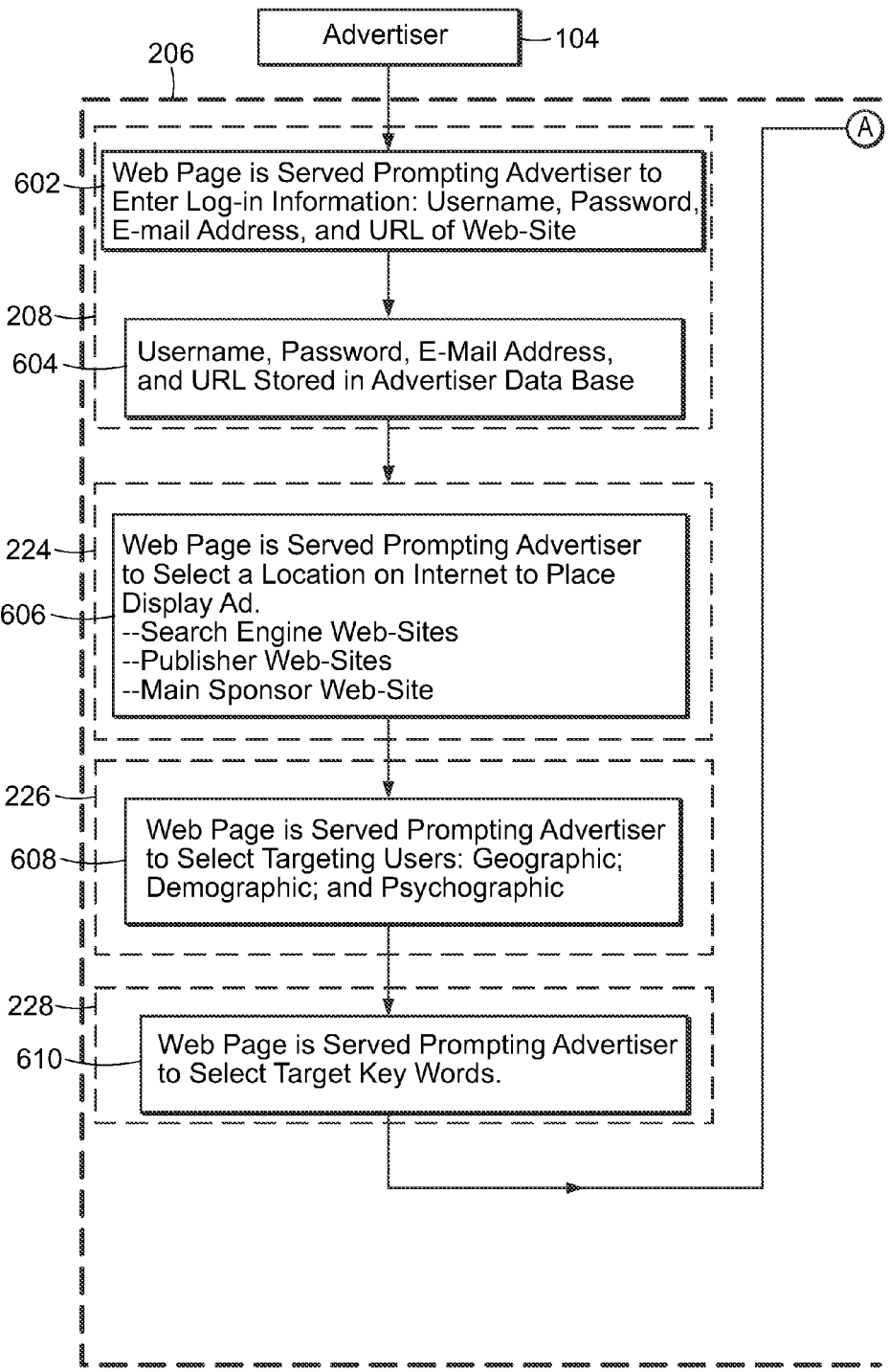
Figure 6B:
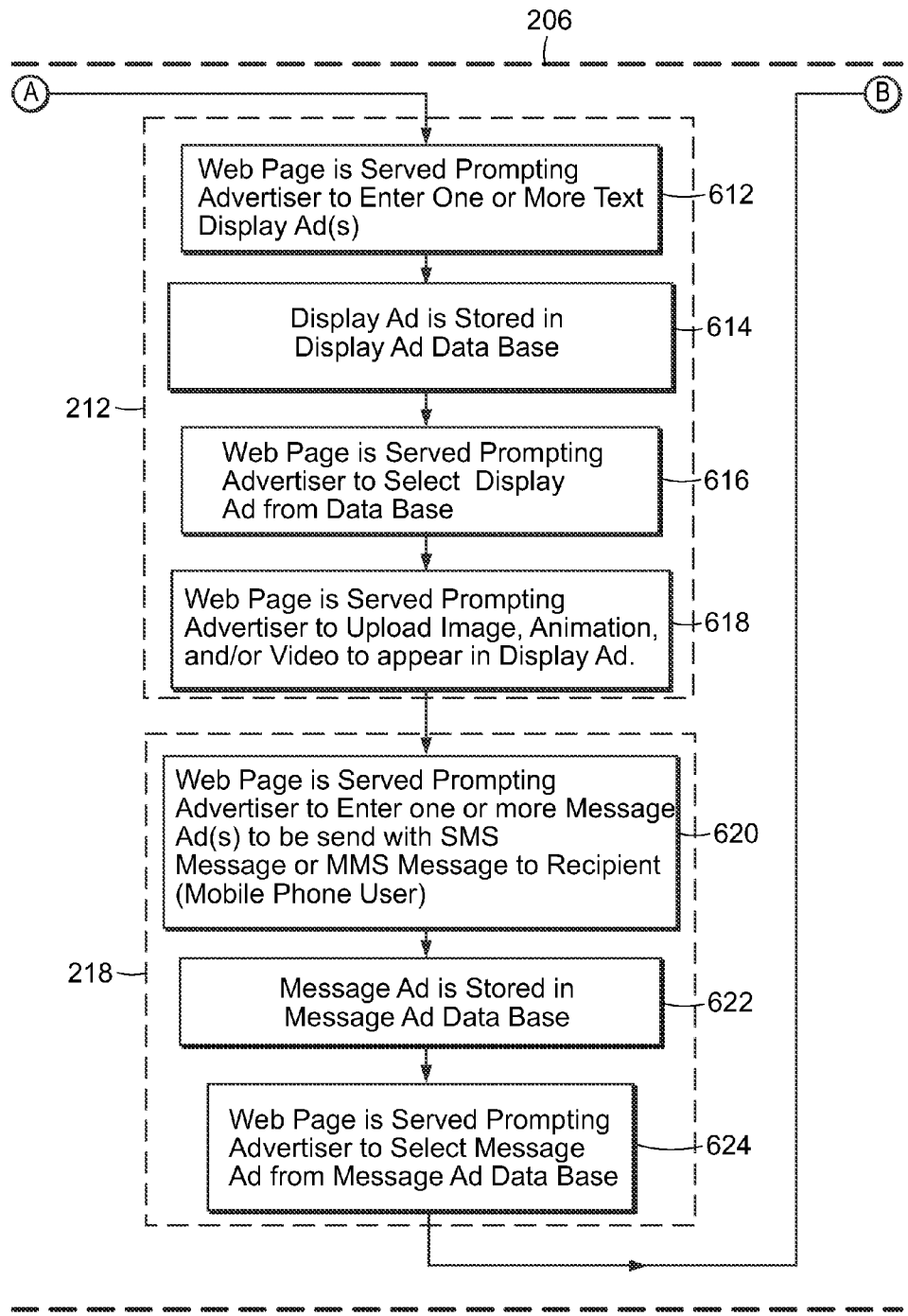
Figure 6C:
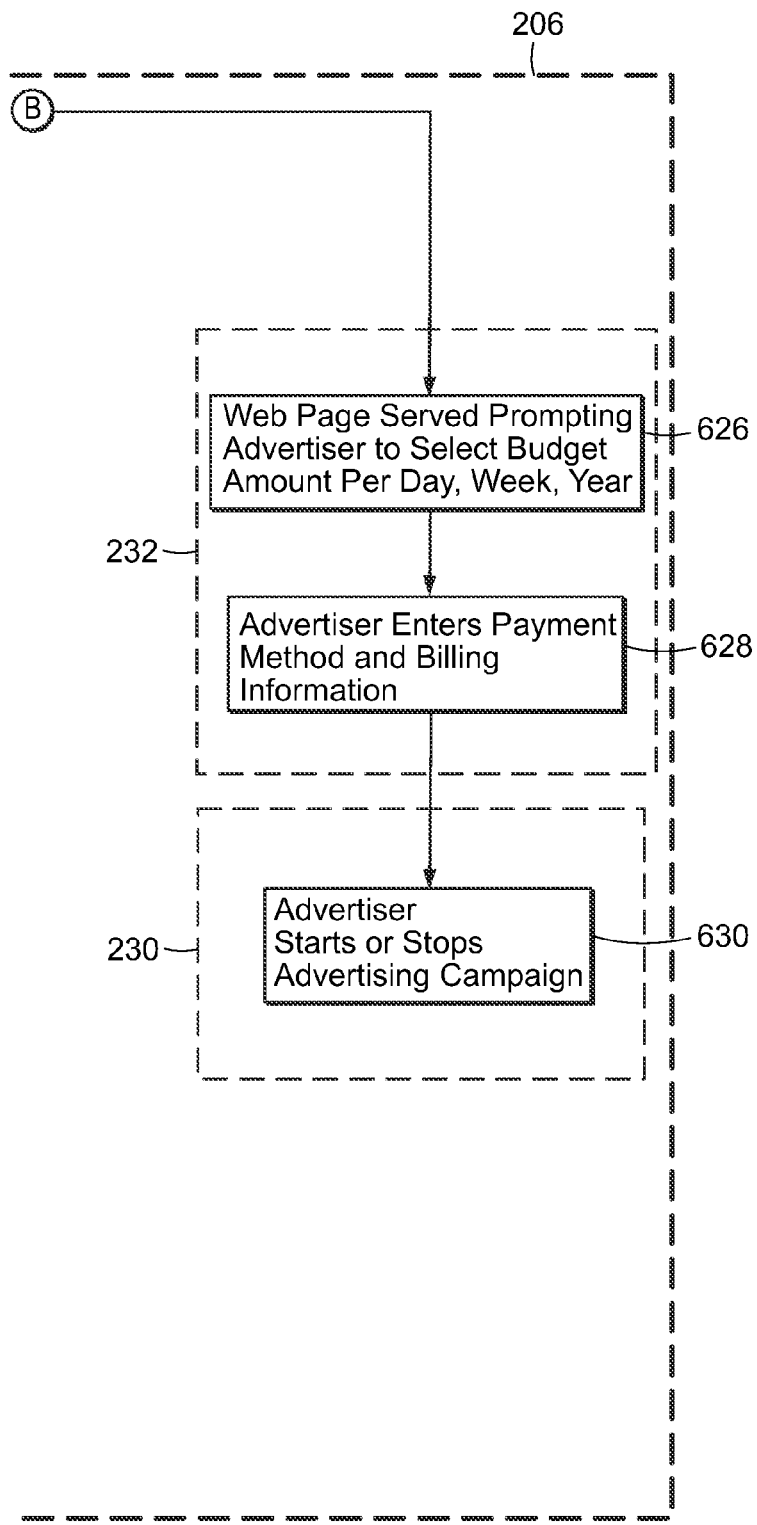

Referring to FIG. 6, a high level flow chart shows the operation of advertiser module 206. As shown by step 602, a web page is served prompting the advertiser to enter log-in information, including a user name, password, valid e-mail address, and a URL for the advertiser's web page. As shown by step 604, advertiser module 206 accepts the user name, password, valid e-mail address, and URL of the advertiser and stores the information in advertiser data base 210. As shown by step 606, a web page is served prompting advertiser 104 to select a location on the internet to place the DISPLAY AD—for example, a search engine website or network, a publisher website or network, or a main sponsor page (to be described). The selected location is stored in advertiser data base 210 as part of an advertising campaign. As shown by step 608, a web page is served prompting advertiser 104 to select targeting features of internet surfer(s) 112 by, for example, geographic, demographic, and psycho-graphic metrics. As shown by step 610, a web page is served prompting advertiser 104 to select target key words. As shown by step 612, a web page is served prompting advertiser 104 to enter one or more text based DISPLAY ADs. As shown by step 614, the DISPLAY AD is stored in Display Ad data base 216 as part of the advertising campaign. As shown by step 616, a web page is served prompting advertiser 104 to select one of the DISPLAY ADs from Display Ad data base 216 (FIG. 2). As shown by step 618, a web page is served prompting advertiser 104 to select one of the DISPLAY ADs from Display Ad data base 216. As shown by step 618, a web page is served prompting advertiser 104 to upload an image, animation, video, audio, game or the like to appear in DISPLAY AD and to store the DISPLAY AD in Display Ad data base 216 as part of the adverting campaign. As shown by step 620, a web page is served prompting advertiser 104 to enter one or more MESSAGE ADs. As shown by step 622, the MESSAGE ADs are stored in Message Ad data base 222. As shown by step 624, a web page is served prompting advertiser 104 to select a MESSAGE AD from Message Ad data base 222. As shown by step 626, a web page is served prompting advertiser 104 to select a budget per day, week, and year. Although the step is not shown, the budget information is stored in advertiser data base 210 as part of advertising campaign. As shown by step 628, a web page is served prompting advertiser 104 to enter payment method and billing information. Although the step is not shown, the payment method and billing information of the advertiser is stored in advertiser data base 210. As shown by step 630, a web page is served allowing the advertiser to activate (start) or stop the advertising campaign upon which a signal is send to message module 234.

Figure 7:
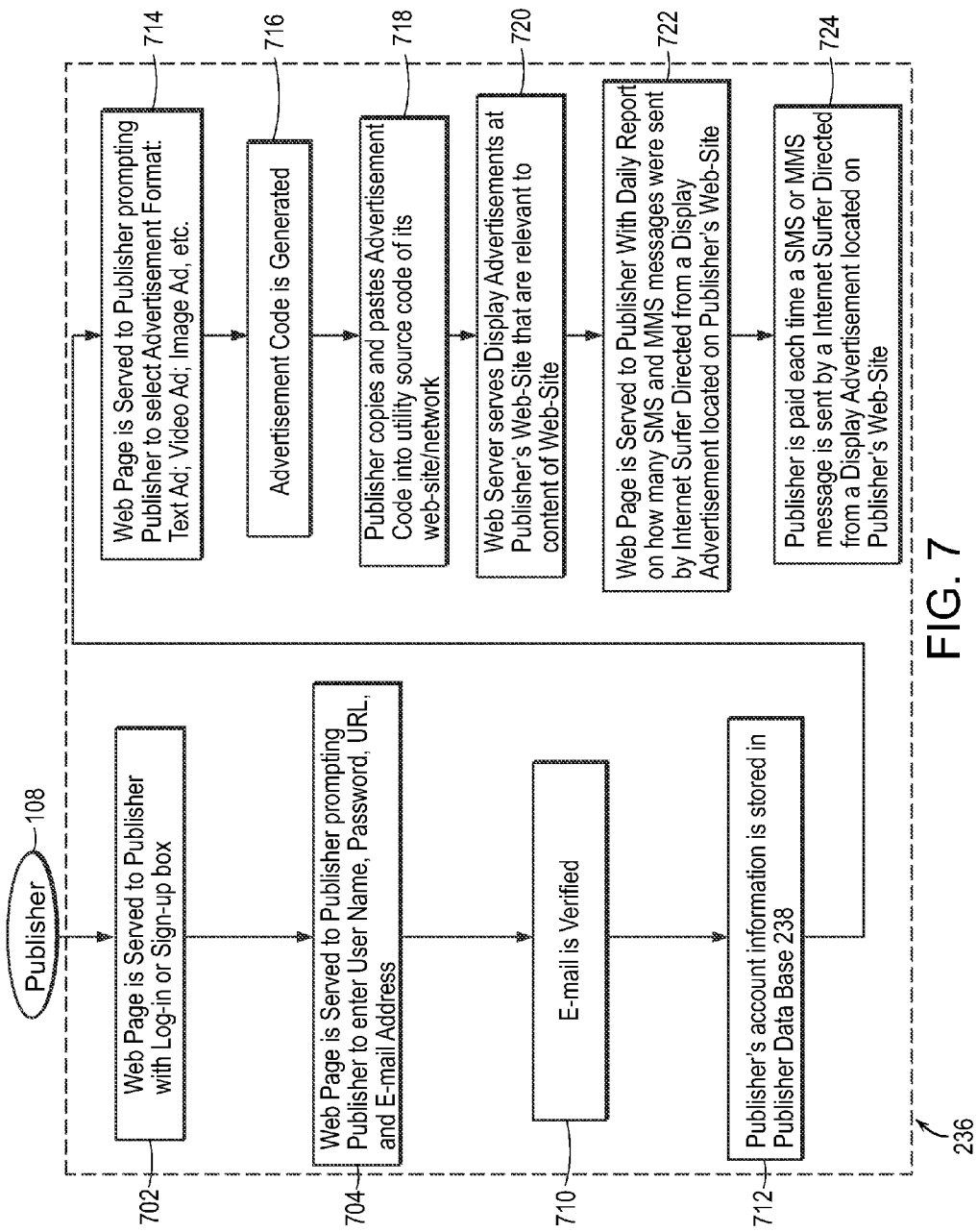
FIG. 7 is a high level flow chart showing the operation of the publisher module according to the present invention.

Referring to FIG. 7, a high level flow chart shows the operation of publisher module 236. As shown by step 702, a home web page is severe to publisher with a log-in box and/or sign-up box. As shown by step 704, a web page is served prompting publisher to enter his/her use name, password, URL, and a valid e-mail address. As shown by block 710, the e-mail address entered by the publisher is verified by sending an e-mail to the publisher with a verification link. As shown by step 712, publisher's account information is stored in publisher data base 238. As shown by step 714, a web page is served to publish prompting the publish to elect an advertisement format to be displayed on publisher's website—for example, text ad, video ad, and a animation ad. As shown by step 716, an advertisement code is generated for the publisher to allow the DISPLAY AD created by the advertiser to be displayed on the publisher's web site. As shown by step 718, the publisher copies and pastes the advertisement code into the utility source code of publisher's website. As shown by step 720, DISPLAY ADs created by advertisers at publisher's website are filtered so as to be relevant to content of publisher's website. As shown by step 722, a web page is served to the publisher with daily reports on how many SMS and MMS messages were sent by internet surfers directed from a DISPLAY AD located on the publisher's website. As shown by step 724, the publisher is paid each time a SMS or MMS message with a MESSAGE AD is sent by an internet surfer directed by a DISPLAY AD located on publisher's website. Payments owed the publisher are stored in publisher data base 238.

Figure 8:
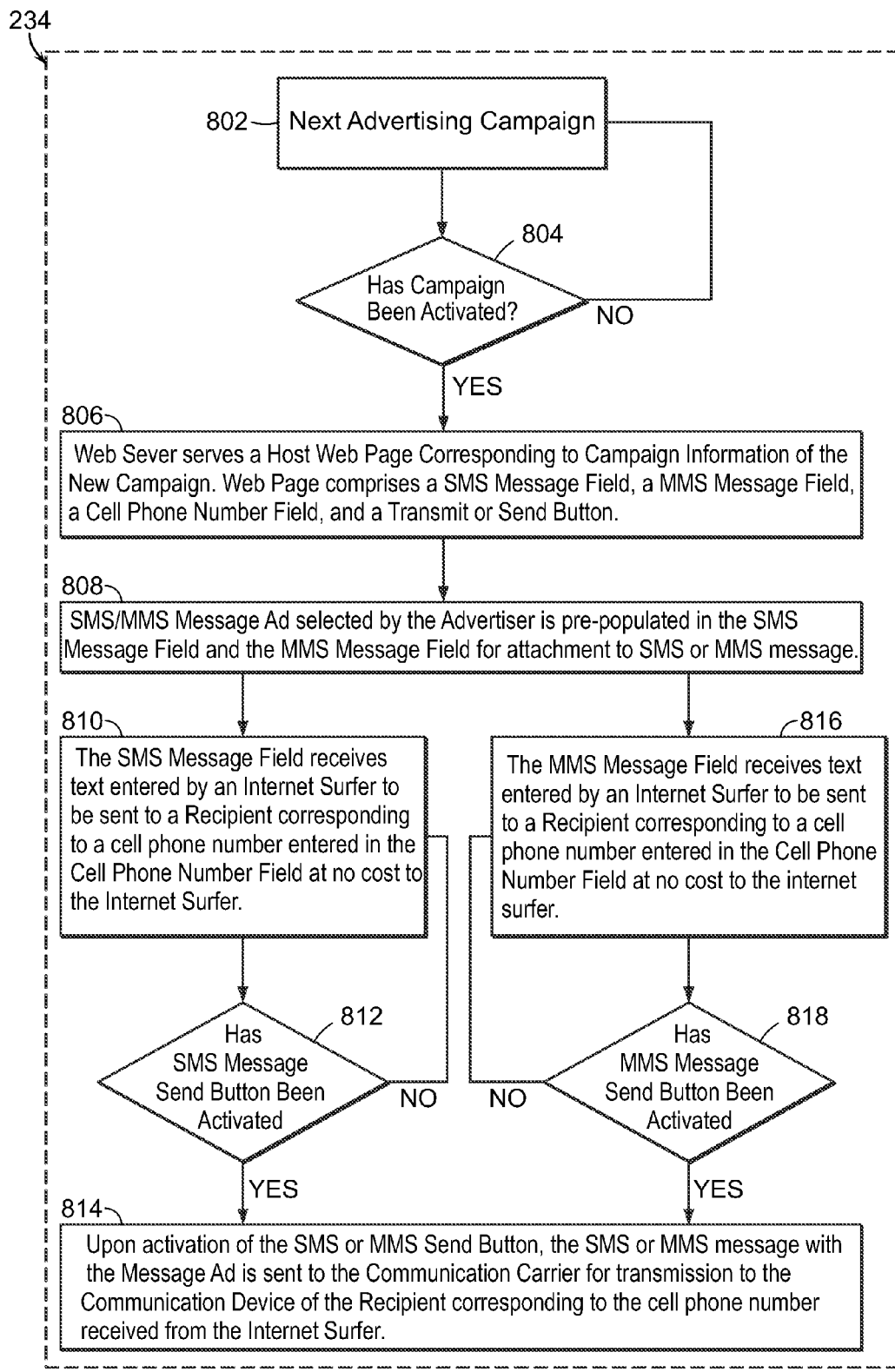
FIG. 8 is a high level flow chart showing the operation of the message module according to the present invention.

Referring to FIG. 8, a high level flow chart shows the operation of message module 234. As shown by step 802, message module 234 checks for the next advertising campaign of all advertising campaigns created by all advertisers. Control is passed to a decisional block 804. As shown by decisional block 804, message module 234 checks if the advertising campaign has been activated. If the advertising campaign has not be activated, control is returned to step 802. If the advertising campaign has been activated then control passes to step 806. As shown by step 806, message module 234 serves an advertising host web page sponsored by the advertiser of the advertising campaign. The advertiser host web page comprises a SMS message field, a MMS message field, a cell phone number field, and a SEND button or link. The SMS message field receives text entered by a surfer to be sent to a recipient corresponding to a cell phone number entered in the cell phone number field at no cost to the internet surfer. The MMS message field receives text, images, animation, video, audio, games, and the like entered by the surfer to be sent to a recipient at no cost to the surfer. As shown by step 808, message module 234 pre-populates the MESSAGE AD in the SMS and MMS message fields or otherwise attaches the MESSAGE AD to the SMS or MMS message entered by the surfer. The MESSAGE AD cannot be changed and/or otherwise removed and/or altered by the surfer. Control is passed to block 810 or 816 depending upon whether the surfer is entering a SMS or MMS message. As shown by step 810, the SMS message field receives text entered by a surfer to be sent to a recipient corresponding to the cell phone number entered in the Cell Phone Number field by the surfer at no cost to the surfer. Control is then passed to a decisional block 812. As shown by decisional block 812, the message module determines whether or not a SEND link from any SMS message box has been activated. If no SEND link has been activated the control is returned to block 810. If the SEND link has been activated, then control is passed to block 814. As shown by block 814, upon activation of a SEND link, the SMS message entered by the surfer with the attached MESSAGE AD is sent to the communication carrier for transmission to the communication device of the recipient corresponding to the cell phone number entered by the surfer. In the case off the surfer using the MMS message service, and as shown by block 816, the MMS message field receives uploaded images, animation, video, audio, games and the like entered by a surfer to be sent to a recipient corresponding to the cell phone number entered in the Cell Phone Number field by the surfer at no cost to the surfer. Control is then passed to a decisional block 818.

As shown by decisional block 818, message module 234 determines whether or not a SEND link from any MMS message box has been activated. If no SEND link has been activated the control is returned to block 816. If the SEND link has been activated, then control is passed to block 814. As shown by block 814, upon activation of a SEND link, the MMS message entered by the surfer with the attached MESSAGE AD is sent to the communication carrier for transmission to the communication device of the recipient corresponding to the cell phone number entered by the surfer.

Message module 234 may also comprise a set of code configured to send a notification to the recipient after the surfer activates or clicks the SEND link of the SMS or MMS message box but before the SMS or MMS message with the attached MESSAGE AD is actually sent to the communication carrier. Upon message module 234 receiving an acceptance of the notification then the SMS or MMS message with the attached MESSAGE AD is sent to the communication carrier for transmission to the communication device of the recipient corresponding to the cell phone number entered by the surfer. Further, upon acceptance of a notification, the recipient's cell phone number is stored in a recipient data base 244 so that future transmissions to the same recipient may be made without sending a notification.

Figure 9:
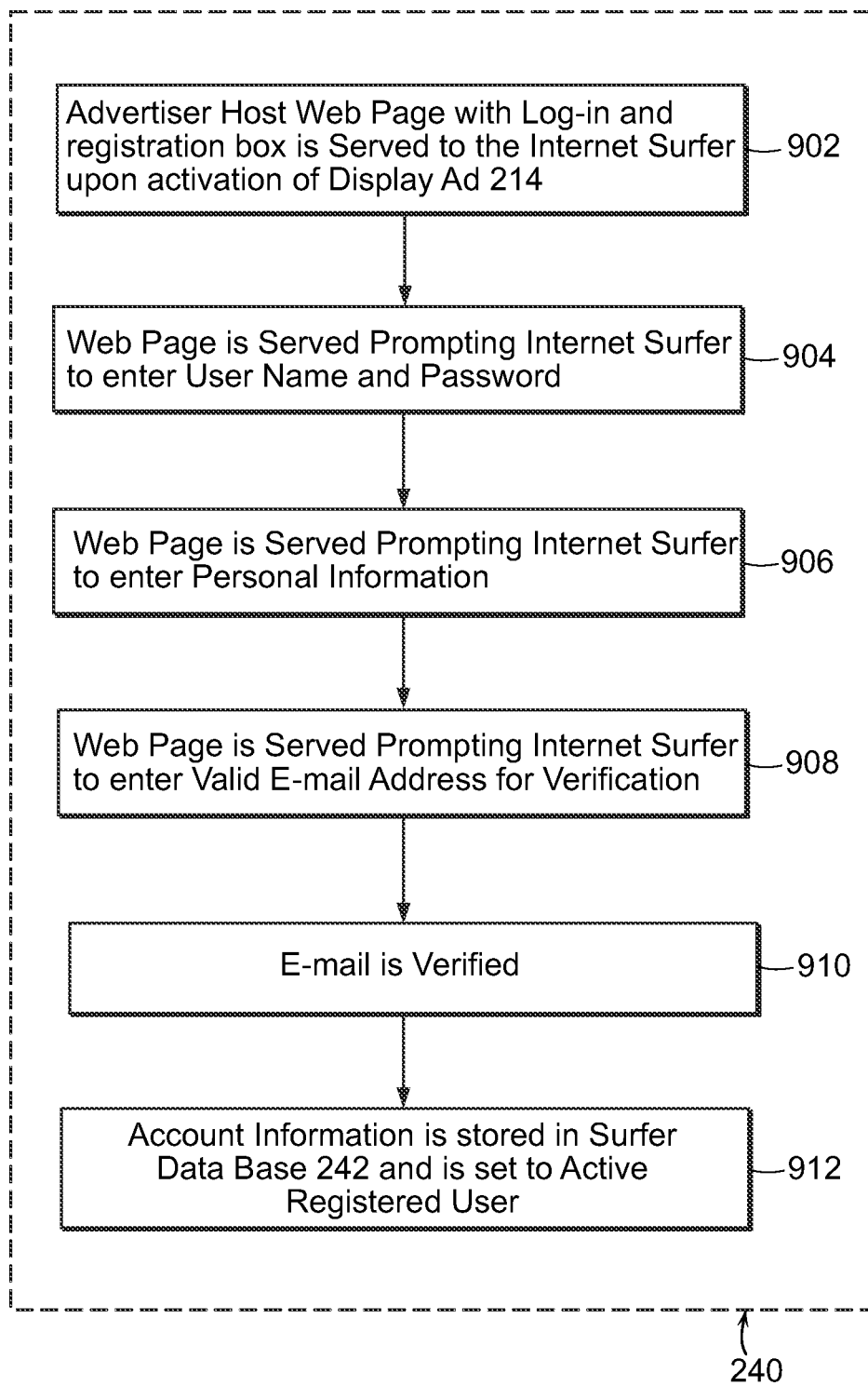
FIG. 9 is a high level flow chart showing the operation of the internet surfer module according to the present invention.

Referring to FIG. 9, where a high level flow chart shows the operation of internet surfer module 240. As shown by block 902, advertiser host web page 400 is served to internet surfer 112 upon activation of DISPLAY AD 214 or DISPLAY AD 215 (FIG. 3). As shown by block 904, a web page is served prompting surfer 112 to enter a user name and password. As shown by block 906, a web page is served prompting surfer 112 to enter personal information such as name and address. As shown by step 908, a web page is served prompting surfer 112 to enter valid e-mail address. As shown by step 910, the e-mail address of internet surfer 112 is verified. As shown by step 912, upon verification, the account information of surfer 112 is stored in internet surfer data base 242 and surfer 112 is set to a registered surfer. On subsequent clicks of a different DISPLAY AD, the surfer may simply log-in by entering his/her username and password.

Figure 10:
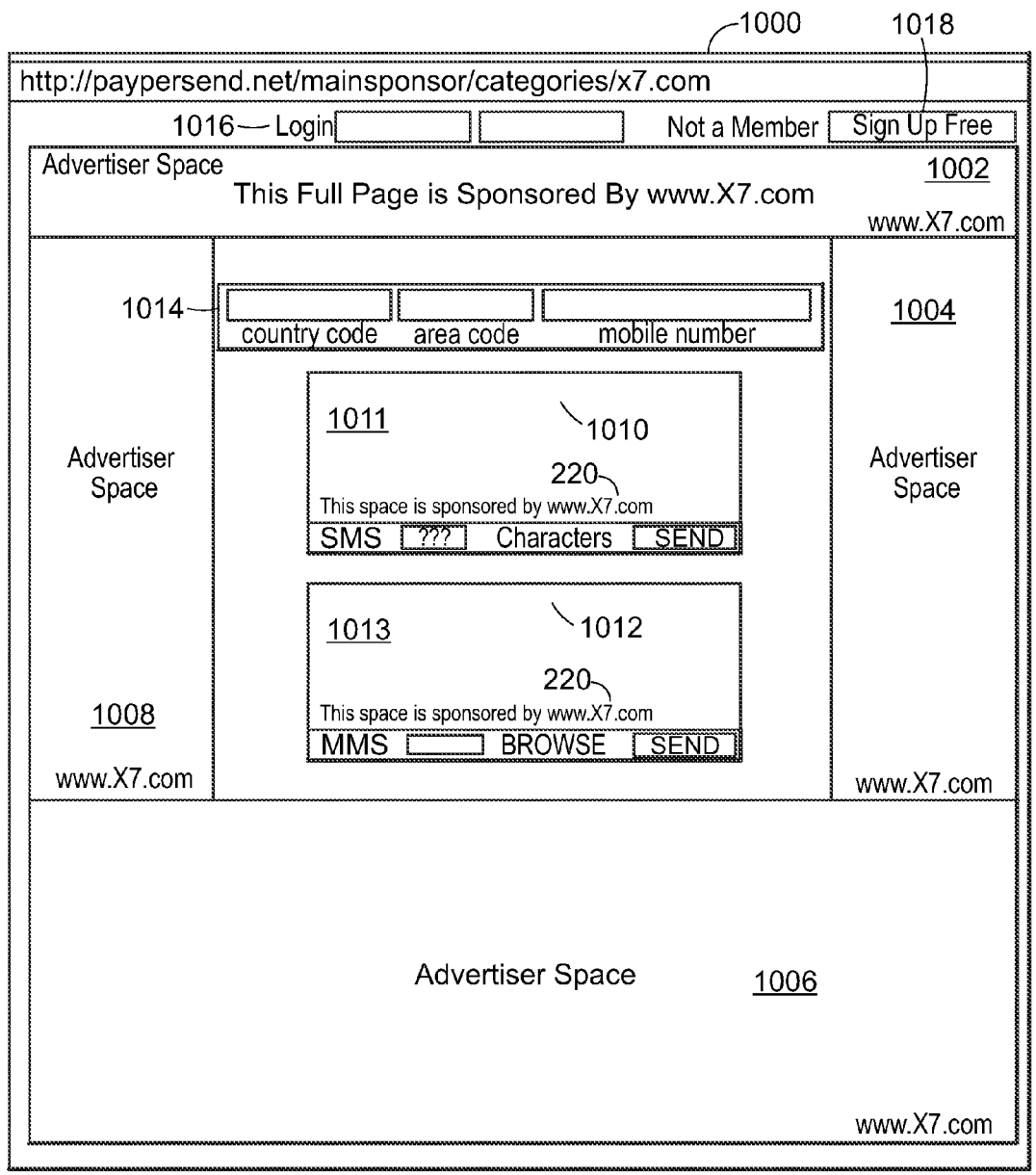
FIG. 10 is an illustration of a main sponsor web page according to the present invention.

Referring to FIG. 10, where a second embodiment of an advertiser host web page 1000 is shown as served to surfer 112 upon activation of DISPLAY AD 214 or DISPLAY AD 215. Advertiser host web page 1000 comprises advertiser spaces 1002, 1004, 1006 and 1008 surrounding a SMS message box 1010 and a MMS message box 1012. SMS Message box 1010 has a message field 1011 pre-populated with a MESSAGE AD 220. Similarly, MMS Message box 1012 has a message field 1013 pre-populated with a MESSAGE AD 220. Advertiser host web page 1000 further comprises a cell phone number box 104, and a login box 106, and a sign-up box 1018.

Figure 11:
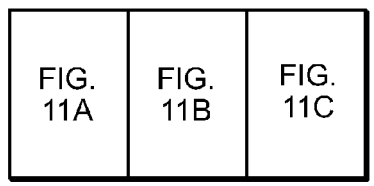
FIG. 11 is a high level flow chart showing a method of advertising on the internet according to the present invention.
Figure 11A:
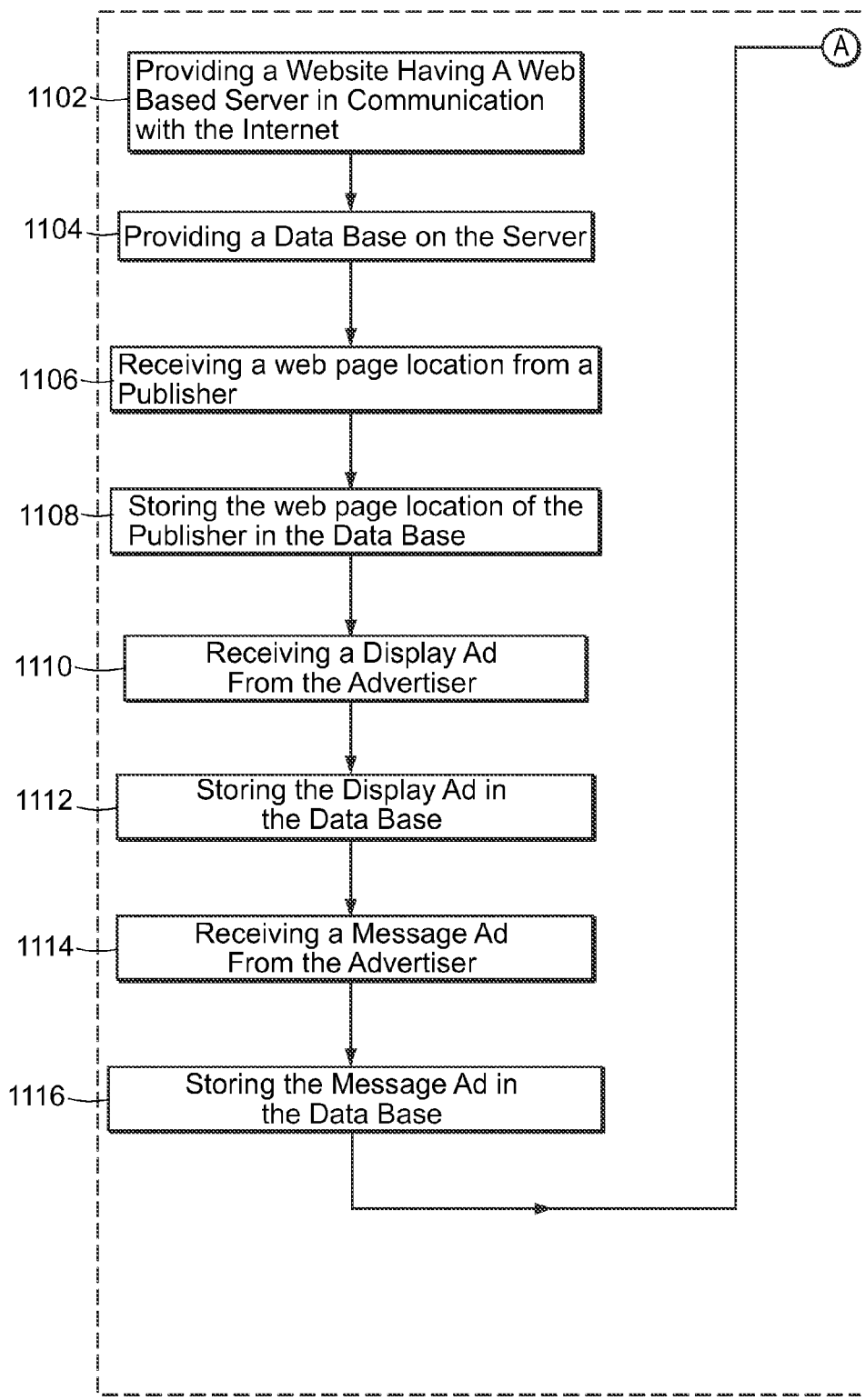
Figure 11B:
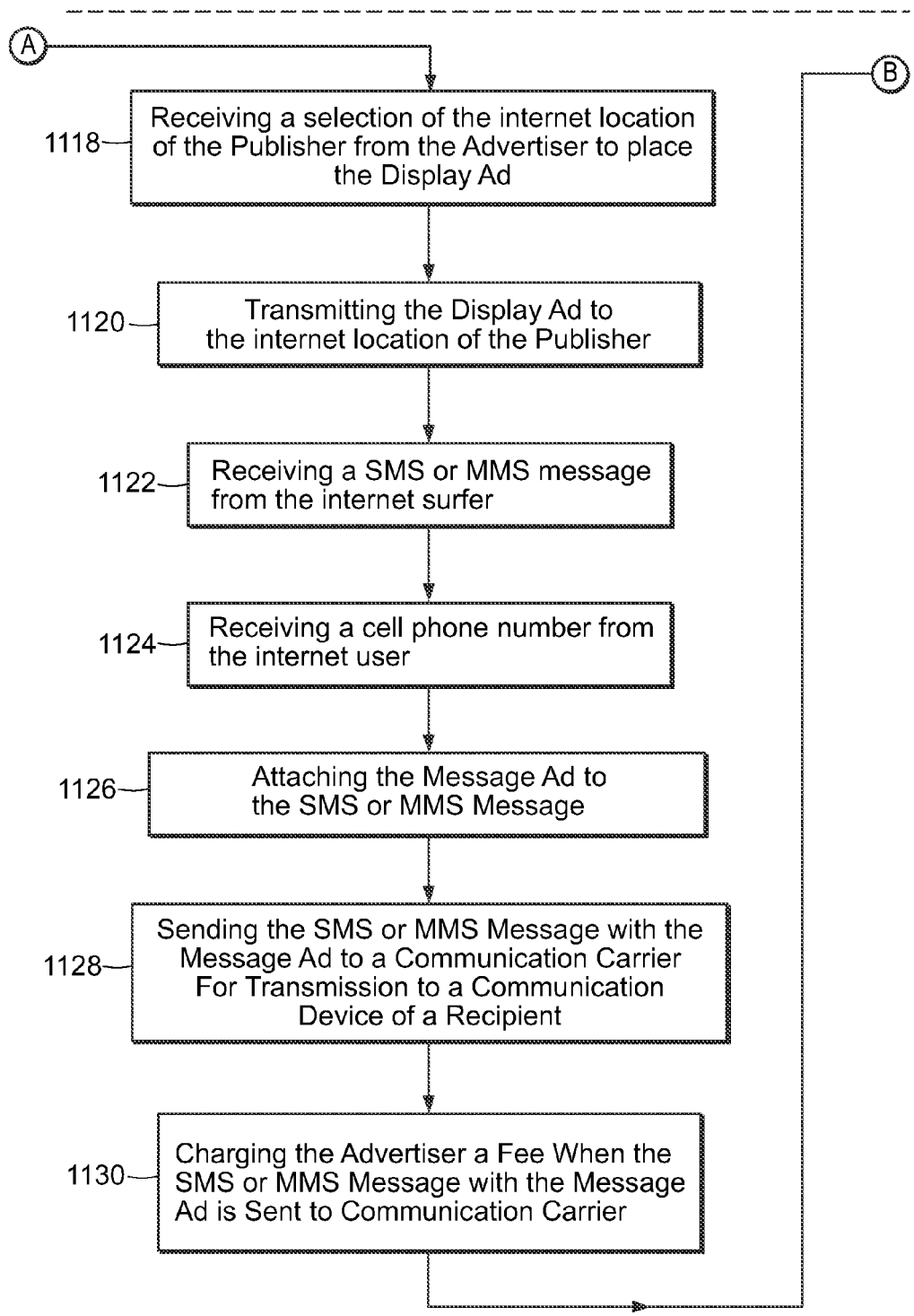
Figure 11C:
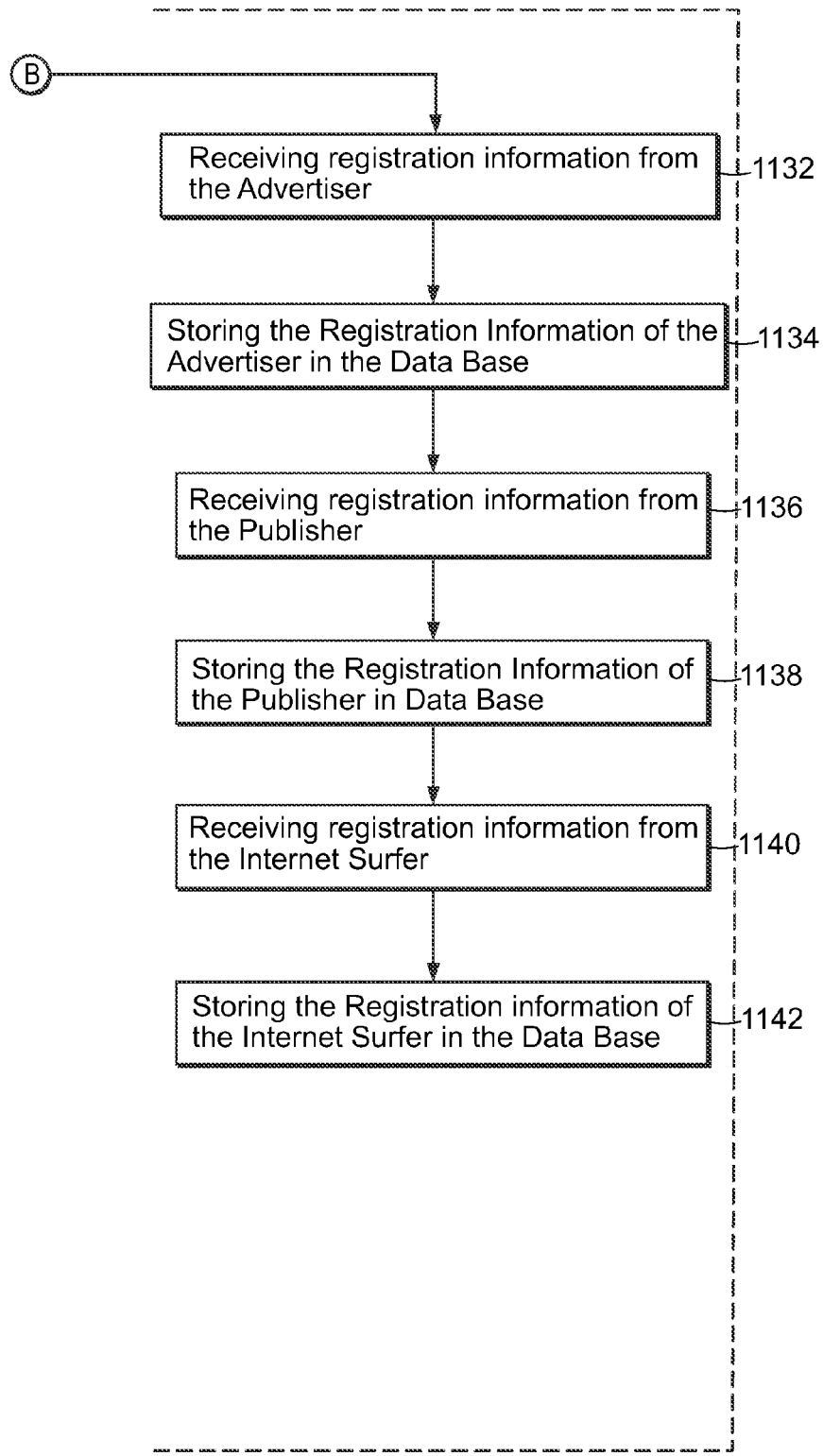

Referring to FIG. 11, where a high level flow chart shows a method of advertising according to the present invention. As shown by block 1102, the method comprises the step of providing a web-site having a web-based server connected to the internet. As shown by block 1104, the method comprises the further step of providing a data base on the server. As shown by block 1106, the method comprises the further step of receiving a web page location from the publisher. As shown by block 1108, the method comprises the further step of storing the web page location of in the data base. As shown by block 1110, the method comprises the further step of receiving a DISPLAY AD from the advertiser. As shown by block 1112, the method comprises the further step of storing the DISPLAY AD in the data base. As shown by block 1114, the method comprises the further step of receiving a MESSAGE AD from the advertiser. As shown by block 1116, the method comprises the further step of storing the MESSAGE AD in the data base. As shown by block 1118, the method comprises the further step of receiving information from the advertiser indicative of an internet location to display the DISPLAY AD on the internet. As shown by block 1120, the method comprises the further step of transmitting the DISPLAY AD to the internet location. As shown by block 1122, the method comprises the further step of receiving a SMS message from the internet surfer. As shown by block 1124, the method comprises the further step of receiving a cell phone number from the internet surfer corresponding to a recipient to receive the SMS message. As shown by block 1126, the method comprises the further step of attaching the MESSAGE AD to the SMS message. As shown by block 1128, the method comprises the further step of sending the SMS message with the MESSAGE AD to the recipient. As shown by block 1130, the method comprises the further step of further comprising the step of charging the advertiser a fee upon sending the message. As shown by block 1132, the method comprises the further step of receiving registration from an advertiser at the web-site. As shown by block 1134, the method comprises the further step of storing the registration information of the advertiser in the second data base. As shown by block 1136, the method comprises the further step of receiving registration information from the publisher. As shown by block 1138, the method comprises the further step of storing the registration information of the publisher user in the data base. As shown by block 1140, the method comprises the further step of receiving registration information from the internet surfer. As shown by block 1142, the method comprises the further step of storing the registration information of the internet surfer user in the data base.

Figure 12:
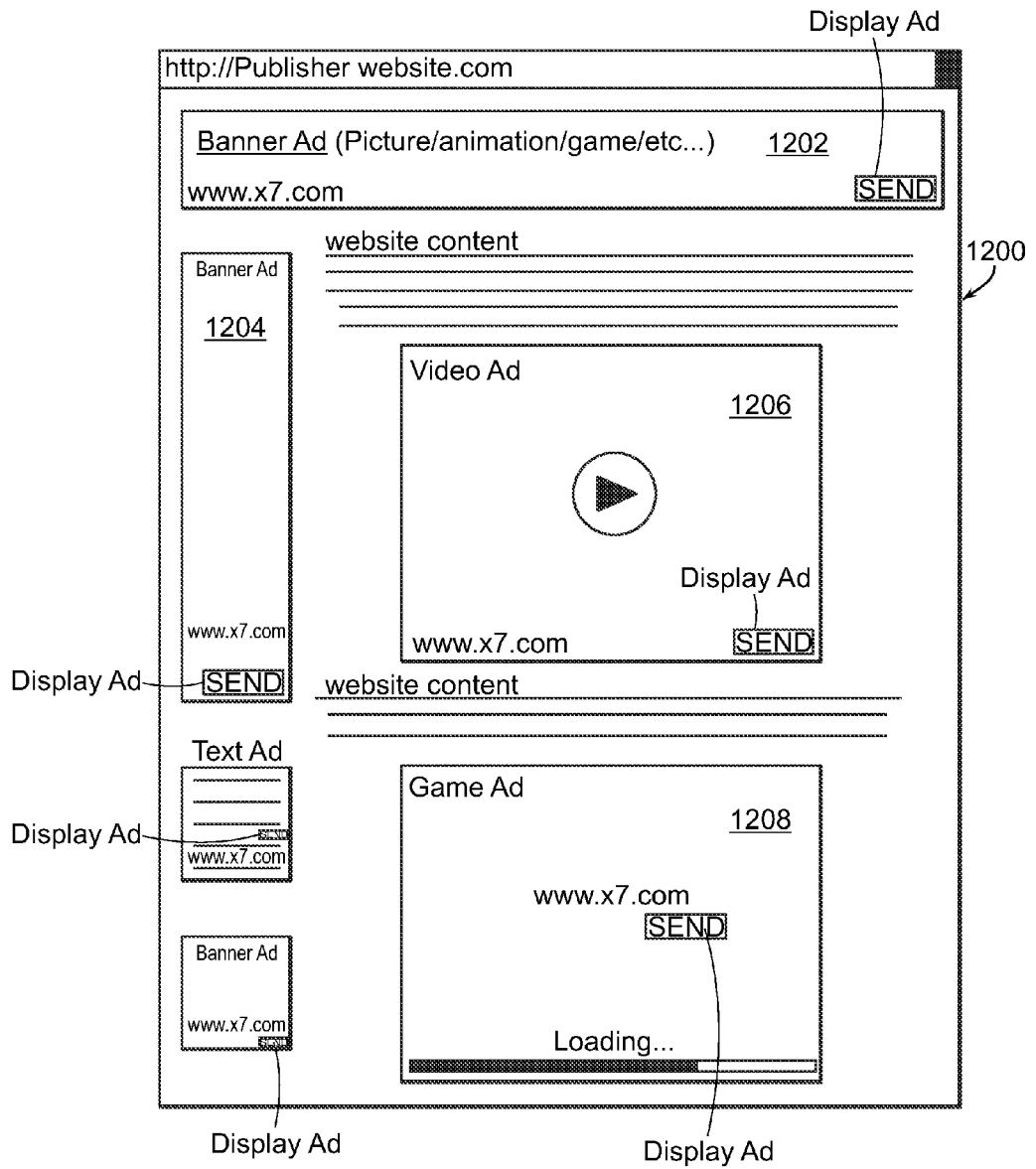
FIG. 12 is an illustration of a publisher's web page having DISPLAY ADS according to the present invention placed within banners ads, a text ad, a video ad, and a game ad.

Referring to FIG. 12, which shows a web page 1200 of a publisher's web-site having multiple SEND DISPLAY ADS appearing as banner ads 1202 and 1204, a video ad 1206, and a game ad 1208. Activation or clicking of any SEND DISPLAY AD will direct the surfer to the advertiser's host web page (FIG. 4 or 10)

The foregoing description is intended primarily for purposes of illustration. This invention may be embodied in other forms or carried out in other ways without departing from the spirit or scope of the invention.

What is claimed:

1. A system for advertising on the internet by one or more advertisers to one or more surfers browsing a web-site or network of a publisher; a communication carrier for sending a message to a communication device of a recipient, the web-site comprising;

a web-based server in communication with the internet; said web-based server comprises:

an advertiser module stored on said web based server and adapted to receive an advertising campaign from the advertiser; said advertiser module comprises a registration module having a first set of registration code configured to receive an URL for a web page of the advertiser; a first generator module having a first set of first generator code configured so the advertiser can create and store a DISPLAY AD on said web-based server; said advertiser module further comprises a second generator module having a first set of second generator code configured so the advertiser can create and store a MESSAGE AD on said web-based server; said advertiser module further comprises a location module having a first set of location code configured so the advertiser can select a location on the internet to place said DISPLAY AD; said advertiser module further comprises an activation module having a first set of activation code to activate said advertising campaign of the advertiser; and a message module stored on said web-based server comprising a first set of message code configured to serve an advertiser host web page to the internet surfer upon activation of said DISPLAY AD; said advertiser host page comprises a first portion having a message box and a second portion displaying said web page of the advertiser; said message box comprises a first message field and cell phone number field; said first message field is adapted to receive a message entered by the surfer; said cell phone number field is configured to receive a cell phone number entered by the internet surfer corresponding to the communication device of the recipient; a second set of message code adapted to attach said MESSAGE AD to said message; and a third set of message code adapted to send said message with said MESSAGE AD to the communication carrier at no cost to the internet surfer.

2. The system of claim 1 further comprising a billing module comprising a first set of billing code adapted to charge the advertiser a fee when said message is sent to the communication carrier.

3. The system of claim 2, wherein said advertiser module further comprises a registration module having a first set of registration code configured to serve a web page so the advertiser can enter registration information and a second set of registration code to adapted to store said registration information on said web-based server as a registered advertiser.

4. The system of claim 3, further comprising a data base stored on said web based sever; said data base comprises a first data base for storing said DISPLAY AD; a second data base for storing said MESSAGE AD; a third data base adapted to store a list of registered advertisers; and a fourth data base adapted to store a list of registered internet surfers.

5. The system of claim 4, wherein said first message field comprises a SMS message field.

6. The system of claim 5, wherein said message box further comprises a second message field.

7. The system of claim 6, wherein said second message field comprises a MMS message field.

8. The system of claim 7, wherein said message received by said first message box is a SMS message.

9. The system of claim 7, wherein said message received by said second message box is a MMS message.

* * * * *